United States Patent [19]

Udipi

[11] Patent Number: 5,051,469

[45] Date of Patent: Sep. 24, 1991

[54] RUBBER MODIFIED REACTION MOLDED NYLON-6 BLOCK COPOLYMERS

[75] Inventor: Kishore Udipi, Longmeadow, Mass.

[73] Assignee: Monsanto Company, St. Louis, Mo.

[21] Appl. No.: 347,536

[22] Filed: May 4, 1989

Related U.S. Application Data

[60] Division of Ser. No. 57,583, Jun. 2, 1987, Pat. No. 4,882,382, which is a continuation-in-part of Ser. No. 808,782, Dec. 13, 1985, abandoned, and a continuation-in-part of Ser. No. 808,790, Dec. 13, 1985, abandoned.

[51] Int. Cl.$^5$ .............................................. C08L 77/00
[52] U.S. Cl. ................................. 525/63; 525/65; 525/66; 525/131; 525/179; 525/902
[58] Field of Search ............... 525/66, 179, 65, 63, 525/131, 902

[56] References Cited

U.S. PATENT DOCUMENTS

| | | | |
|---|---|---|---|
| Re. 30,371 | 8/1980 | Hedrick et al. | 528/312 |
| 3,017,392 | 1/1962 | Butler et al. | 260/78 |
| 4,306,040 | 12/1981 | Baer | 525/310 |
| 4,336,177 | 6/1982 | Backhouse et al. | 523/201 |
| 4,375,532 | 3/1983 | Baer | 525/310 |
| 4,419,465 | 12/1983 | Backhouse et al. | 523/201 |
| 4,427,820 | 1/1984 | Backhouse et al. | 524/504 |
| 4,448,956 | 5/1984 | Lenke et al. | 528/312 |
| 4,473,686 | 9/1984 | Grigo et al. | 525/184 |
| 4,495,324 | 1/1985 | Chacko et al. | 524/504 |
| 4,501,861 | 2/1985 | Woodbrey | 525/421 |
| 4,584,344 | 4/1986 | Baer | 525/66 |
| 4,590,243 | 5/1986 | Gabbert et al. | 525/184 |
| 4,598,125 | 7/1986 | Horn et al. | 525/183 |
| 4,882,382 | 11/1989 | Udipi | 526/66 |

FOREIGN PATENT DOCUMENTS 0151911 8/1985 European Pat. Off. .

*Primary Examiner*—Ana L. Carrillo
*Attorney, Agent, or Firm*—Thomas E. Kelley; Richard H. Shear

[57] ABSTRACT

Dispersions of core-shell polymers in caprolactam solutions of telechelic polymers capable of being polymerized to form rubber-modified nylon-6 block copolymers having improved impact strength wherein the core-shell polymer comprises a crosslinked elastomer core and a hard thermoplastic polymer shell and wherein the telechelic polymers preformed or formed in situ, are capped with lactam polymerization initiator groups.

15 Claims, No Drawings

RUBBER MODIFIED REACTION MOLDED NYLON-6 BLOCK COPOLYMERS

This application is a division of application Ser. No. 07/057,583, filed June 2, 1987 now U.S. Pat. No. 4,882,382, which is a continuation-in-part of applications Ser. No. 808,782, now abandoned, and 808,790, now abandoned, both filed Dec. 13, 1985 and incorporated herein by reference.

This invention relates to dispersions of core-shell polymers in caprolactam solutions of telechelic polymers, to processes for the preparation of such dispersions, to rubber modified nylon-6 block copolymers prepared by reaction molding such dispersions and to such reaction molding processes.

Unmodified nylon polymers are generally regarded as "tough thermoplastics" since they exhibit good elongation, high energy to break and high energy absorption in falling dart tests. However, they are notch sensitive, i.e., they are not resistant to crack propagation and this often results in brittle or catastrophic failure. Incorporation of an elastomer as a dispersed phase helps overcome this deficiency and there is much prior art in the literature related to this. Such elastomers are normally dispersed in nylon polymers by melt blending under high shear and the polymers so toughened exhibit greatly reduced notch sensitivity and ductile failure. They are, however, characterized by a very broad distribution of elastomer particle size diminishes the efficiency of toughening.

In the case of nylon-6 polymers prepared by reaction injection molding (RIM) or by transfer molding where caprolactam monomer is polymerized in a mold, the above toughening method by dispersion of an elastomer in the nylon is not applicable. Instead, nylon-6 reaction molded products are toughened by block copolymerizing caprolactam with low molecular weight telechelic polymers such as functionalized polyethers and polybutadienes. Since nylon-6 and telechelic polymers such as polyethers and polybutadienes are incompatible, they form separate phases in the block copolymers. The particle size of the elastomer phase in such systems may be expected to be small and fairly uniform, but is not readily adjusted for efficient reinforcement because of the restrictions on phase separation related to the placement of the elastomeric segments within the backbone of the block copolymer. Also these low molecular weight elastomeric segments can exert a plasticizing effect on the block copolymer and cause a lowering of the flexural modulus.

I have found a method of toughening reaction molded nylon-6 block copolymers by the use of a preformed rubber graft of core-shell morphology containing a soft rubber or elastomer core and a hard thermoplastic shell. Thus toughened polymers with superior flexural modulus can be obtained by replacing some of the telechelic polymer with core-shell polymer. In the method, a substantially colloidal dispersion of core-shell polymer in a caprolactam solution of a telechelic polymer or of a polyol and an at least difunctional caprolactam polymerization initiator is prepared and the dispersion is subjected to caprolactam polymerization conditions to provide a nylon-6 block copolymer with core-shell polymer dispersed therein. Throughout this description, caprolactam is the epsilon isomer, namely 2-oxohexamethylene imine.

The present invention is directed to a stable, substantially colloidal dispersion of a core-shell polymer in a solution of caprolactam containing a telechelic polymer, capable of being polymerized to form a rubber-modified nylon-6 block copolymer upon addition of an effective amount of caprolactam polymerization catalyst. The core-shell polymer comprises a crosslinked elastomer core and a hard thermoplastic polymer shell. The weight ratio of crosslinked elastomer core to caprolactam and the weight ratio of telechelic polymer to caprolactam are both independently in the range of about 1:99 to about 40:60. In some cases it is preferred that those weight ratios be in the range of from about 5:95 to about 30:70. The telechelic polymer is of number average molecular weight in the range of about 700 to about 10000; is capped, on average, with at least two lactam polymerization initiator groups or precursors thereof per molecule; and is capable of providing soft segments in the nylon-6 block copolymer.

The present invention is further directed to compositions capable of being reaction molded to form a nylon-6 block copolymer. Such compositions comprise core-shell polymer substantially colloidally dispersed in a caprolactam solution containing a telechelic polymer as described above and also an effective amount of a caprolactam polymerization catalyst.

Another aspect of the invention is directed to a rubber modified nylon-6 block copolymer composition and articles formed therefrom by reaction molding comprising a core-shell polymer dispersed in nylon-6 block copolymer containing nylon-6 blocks and elastomeric blocks provided by a telechelic polymer, wherein the core-shell comprises a crosslinked elastomer core and a hard thermoplastic polymer shell. In some cases it is preferable that the polymer shell comprise a graft copolymer of nylon-6.

Another aspect of the invention is directed to the process for preparation of a substantially colloidal dispersion of a core-shell polymer in a solution of caprolactam containing a telechelic polymer the individual molecules of which are capped on average, with, at least two lactam polymerization initiator groups (or precursors thereof). The process comprises adding an aqueous dispersion of core-shell polymer to an aqueous solution of caprolactam, stirring the mixture to provide a uniform dispersion, evaporating water from the mixture and adding the telechelic polymer to the dispersion of core-shell polymer in caprolactam.

And yet another aspect of the invention is directed to a process of reaction molding a rubber modified nylon-6 block copolymer by intimately mixing two reaction compositions; adding the mixture to a mold and subjecting the mixture to reaction molding conditions until polymerization is essentially complete. The first reaction composition comprises a caprolactam solution of a telechelic polymer and the second reaction composition comprises a caprolactam solution of an effective amount of a catalyst for caprolactam polymerization. The telechelic polymer is capped on average, with at least two lactam polymerization initiator groups or precursors thereof per molecule and provides an effective concentration of initiator groups for caprolactam polymerization. At least one of the first and second reaction compositions comprises a substantially colloidal dispersion of core-shell polymer, where the core-shell polymer comprises a crosslinked elastomer core and a hard thermoplastic polymer shell. The weight ratios of elastomer core to total caprolactam and telechelic polymer to total caprolactam are both independently in the range of about 1:99 to about 40:60, preferably 5:95 to about 30:70.

The elastomer or rubber core of the core-shell polymer should be crosslinked in order to better preserve the particulate form on dispersion and to avoid excessive swelling by hot caprolactam. The hard shell, on the other hand, can prevent the particles from sintering during processing and at elevated temperatures such as those employed to polymerize caprolactam. Furthermore, the composition of the shell can be varied to make it compatible or interactive with nylon-6 matrix. In order for the shell to be compatible with polycaprolactam, it may consist of a proportion of suitably polar monomers like (meth)acrylonitrile or N-substituted (meth)acrylamides. It may, also, be desirable for the shell to contain interactive comonomers capable of participating in caprolactam polymerization in which case the rubber particles would be chemically bonded to the nylon matrix through the grafted shell. Such reactive monomers include, among others, hydroxyalkyl (meth)acrylates, (meth)allyl alcohol, and glycidyl (meth)acrylate. Advantageously the concentration of such interactive comonomers interpolymerized into the hard shell is in the range of about 1 to about 10 parts per 100 parts by weight of shell to provide a suitable amount for grafting of caprolactam thereto.

To obtain efficient toughening of nylon-6 polymer, the core-shell polymer rubber should be substantially colloidally dispersed as particles of average diameter in the range of about 0.1 to 0.8 micron in caprolactam monomer. Such a particle size can be obtained either by selection of polymerization conditions for forming the core-shell polymer or by agglomeration or seeding techniques known to those skilled in the art. The core-shell polymer is colloidally dispersed as a core-shell polymer emulsion, or a wet cake of core-shell polymer obtained from such emulsion, in caprolactam or an aqueous solution of caprolactam; removal of water from the caprolactam solution provides a fine (i.e. substantially coldispersion of latex or agglomerated latex in caprolactam. The dispersions can be subjected to caprolactam polymerization conditions to allow high conversions while still maintaining the dispersion of core-shell polymer free of clumping or sintering.

The core-shell polymer of the present invention is an elastomer based composite multiphase interpolymer material having a crosslinked elastomer core and a hard or rigid thermoplastic polymer shell advantageously in a weight ratio of core to shell in the range of about 9:1 to about 1:1.

The elastomer core can be a diene elastomer, an ethylene-propylene-diene rubber, an acrylic elastomer, or a polyurethane elastomer. The diene elastomers include polybutadiene, polyisoprene, polychloroprene and poly(cyanobutadiene). the diene may be copolymerized with up to about 50 weight percent of other monomers such as alkyl acrylates and methacrylates, styrene, α-methylstyrene, acrylonitrile and substituted acrylonitriles, vinyl ethers, vinyl amides, vinyl esters and the like. The acrylic elastomers comprise 50 to 100 parts by weight of an alkyl acrylate containing 1 to 10 carbon atoms, preferably 2 to 8 carbon atoms, 0 to 40 parts by weight of other ethylenically unsaturated monomers and, to provide crosslinking, preferably 0.1 to 5 parts by weight of a polyunsaturated crosslinking monomer such as polyacrylic and polymethacrylic esters of polyols such as butylene diacrylate and dimethacrylate, trimethylolpropane trimethacrylate and the like, vinyl acrylate and methacrylate, divinyl and trivinyl benzene and the like. Optionally from about 0.1 to about 5 parts by weight of a graft-linking monomer with two or more addition polymerizable unsaturated groups which participate in polymerization at different rates, may also be included. It is preferred that the graft-linking monomer has at least one reactive group which polymerizes at about the same rate, or slightly slower than the other monomers, while the remaining reactive group or groups polymerize at a substantially slower rate. The differential polymerization rates result in a residual level of unsaturation in the elastomer core, particularly during the later stages of polymerization and, consequently, at or near the surface of the elastomer particles. Such graft-linking monomers include allyl (meth)acrylates for acrylic systems, diene monomers in ethylene-propylendiene rubbers, and monallyl ethers of polyols incorporated into urethane elastomers. The diene elastomers provide crosslinking sites at their unsaturated groups but sites may also be formed by copolymerization with monomers such as allyl (meth)acrylates. When the rigid thermoplastic shell is subsequently polymerized at the surface of the elastomer, the residual unsaturated addition-polymerizable reactive groups contributed by the graft-linking monomer participate in the subsequent reaction so that at least a portion of the rigid shell is chemically attached to the surface of the elastomer. The crosslinked elastomer core preferably has a glass transition temperature below about −25° C. and a swelling index in caprolactam of less than about 2.

The elastomer core is prepared in bulk, in emulsion or in solution. Those prepared in bulk or solution are converted into aqueous emulsion by known techniques prior to the addition polymerization of the rigid polymer shell thereto.

Monomers for the formation of the hard or rigid thermoplastic polymer shell are selected so that the rigid polymer has moderate to high polarity and possesses a glass transition temperature at least about 35° C. The relatively high polarity provides a degree of compatibility of the rigid thermoplastic polymer with caprolactam and its polymer and hence it is believed that the dispersibility of the core-shell polymer in caprolactam and the stability of the dispersion is enhanced so that a uniform dispersion of particles of elastomer of about the same size as the original elastomer latex and efficient toughening of the nylon-6 polymer is achieved. The compatibility is also enhanced by inclusion of reactive monomers in the rigid graft polymer such as the hydroxy and epoxy monomers set forth hereinabove which allow grafting of caprolactam onto the rigid shell. At least about ten weight percent of the graft copolymer comprises polar or reactive monomer. The polar monomers may be selected from ethylenically mono-unsaturated monomers such as $C_1$ to $C_8$ alkyl (meth)acrylates, vinyl esters, (meth)-acrylonitrile, (meth)acrylamide, vinyl pyrrolidone, vinyl urea and N-vinylimides. Among the preferred polar monomers are methyl methacrylate, acrylonitrile and methacrylonitrile. Nonpolar monomers such as styrene may be used as comonomers in the graft polymer in a concentration up to about 90 weight percent of the graft polymer. A preferred graft copolymer comprises styrene and acrylonitrile in the weight ratio of about 9:1 to about 6:4, providing a suitably rigid shell to protect the core from sintering and a sufficient compatibility with caprolactam to provide stability to the caprolactam dispersion.

It may, also, be desirable for the shell to contain reactive monomers capable of participating in caprolactam polymerization in which case the rubber particles would be chemically bonded to the nylon matrix through the grafted shell. Such reactive monomers can include, among others, hydroxyalkyl (meth)acrylates, (meth)allyl alcohol, and glycidyl (meth)acrylate. Advantageously the concentration of such reactive comonomers interpolymerized into the hard shell is in the range of about 1 to about 10 parts per 100 parts by weight of shell to provide a suitable amount for grafting of caprolactam thereto.

The multiphase core-shell polymers are advantageously prepared by emulsion polymerization of the shell comonomers in the presence of an emulsion of the elastomer core by known techniques which favor the formation of rigid thermoplastic polymer shell around the elastomer core rather than discrete particles of rigid polymer separate from the core.

The elastomer core emulsion is advantageously of weight average particle diameter in the range of about 0.1 to about 0.8 micron and the thickness of the rigid polymer shell calculated from the weight added to the core elastomer should be sufficient to prevent coalescence and sintering during processing, preferably at least about 0.015 micron. Although not necessary when the process of preparing dispersion according to this invention is followed, in some cases the particle diameter is preferably in the range of about 0.15 to about 0.7 micron to provide an advantageous proportion of rigid polymer shell to elastomer core to prevent coalescence and sintering of the emulsion particles during the dispersion of the core-shell polymer in caprolactam.

When the elastomer core comprises a butadiene polymer or an acrylic polymer prepared by emulsion polymerization, the particle size is generally in the range of about 0.1 to about 0.2 micron. Seeding techniques can provide emulsions of larger particle size. However, since emulsion polymerization conditions which favor the formation of large particle size, may cause a significant degree of coagulation of the elastomer core causing kettle fouling and detracting from the formation of fine, uniform dispersions of the multiphase core-shell polymer in caprolactam and the nylon-6 derived therefrom, it is generally preferred to form butadiene and acrylic elastomer core emulsions of large particle size in the range of about 0.3 to about 0.8 micron by controlled agglomeration of emulsions of 0.1 to 0.2 micron particle size. Agglomeration may be achieved by any conventional means such as by the addition of a suitable amount of water soluble, carboxylic acid or anhydride of such acid. The agglomerated emulsion is then stabilized by addition of a suitable emulsifier.

The amount of elastomer core in the multiphase core-shell polymer may range from about 40 to about 90 parts by weight with about 10 to about 60 parts by weight of rigid polymer shell applied thereto. More preferably, the amount of elastomer core is in the range of about 60 to about 80 parts by weight and the amount of rigid polymer shell is in the range of about 20 to about 40 parts by weight.

Polymerization of the rigid polymer shell is carried out under conditions which favor polymerization at or onto the surface of the elastomer core emulsion so that no substantial number of new "seeds" or particles form in the emulsion. This is generally accomplished by controlling the amount of emulsifier and initiator and by controlling the rate of addition of monomer, emulsifier and initiator. Preferably no further emulsifier is added after formation of the core elastomer emulsion. When polymerization is substantially complete, the multiphase core-shell polymer may be used as an aqueous latex for dispersion in caprolactam or it may first be coagulated by any convenient method such as by freezing, by addition of a coagulating solvent such as methanol optionally containing a small amount of strong acid such as hydrochloric acid, or by addition of an aqueous solution of a polyvalent metal salt such as magnesium sulfate or aluminum sulfate. The coagulated emulsion is filtered, washed thoroughly with water to remove emulsifiers and salts and the filter cake is added to caprolactam or an aqueous solution of caprolactam and dispersed therein with stirring.

After the aqueous core-shell polymer has been uniformly dispersed in caprolactam, the aqueous solution is distilled or stripped with nitrogen purge at atmospheric pressure or under reduced pressure until all the water is removed. To the dispersion of core-shell polymer in caprolactam is then added the telechelic polymer, and, optionally, acyllactam initiator; or a solution in caprolactam of the telechelic polymer, and, optionally, acyllactam initiator; and the dispersion is mixed until a uniform dispersion of core-shell polymer is obtained. Advantageously dispersions with suitable viscosity for mixing with the other components of the reaction mixtures which upon polymerization yield rubber modified nylon-6 block copolymers, contain independently from about 1 to about 40 parts by weight of rubber or elastomer core and from about 1 to about 40 parts by weight of telechelic polymer per 100 parts by weight of caprolactam and preferably contain independently from about 5 to about 30 parts by weight of rubber or elastomer core and from about 5 to about 30 parts by weight of telechelic polymer per 100 parts by weight of caprolactam. Such dispersions are generally mixed with caprolactam containing caprolactam polymerization catalyst to provide the final polymerization mixture for production of the rubber modified nylon-6 block copolymer.

The telechelic polymer is advantageously of number average molecular weight in the range of about 700 to about 10,000 and comprises a backbone containing segments which are generally described as "soft" since they contribute a glass transition temperature of less than about 0° C. and preferably less than about $-25°$ C. when they are incorporated into a nylon-6 block copolymer. Such segments are advantageously selected from the group consisting of polyalkylene oxides, polyalkadienes, and alkadiene(meth)acrylonitrile copolymers of average molecular weight in the range of about 500 to about 5000 and may provide the only units of backbone or several such segments may be linked together by ester, amide, urethane or similar linkages. The telechelic polymer comprises lactam polymerization initiator groups or precursors thereof, advantageously in the range of, on average, at least two and up to about 6 per telechelic polymer molecule. The initiator groups include those represented by the formula

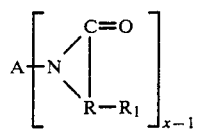

where A is attached to the backbone of the telechelic polymer and is a group selected from CO, CS, $B(CO)_x$,

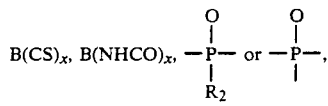

whereB is a $C_1$ to $C_{30}$ hydrocarbyl radical, where x is in the range of 2 to 4, where R is a $C_4$ to $C_{11}$ alkylene or oxoalkylene radical, $R_1$ is hydrogen or a $C_1$ to $C_4$ alkyl radical and $R_2$ is a $C_1$ to $C_{10}$ hydrocarbyl radical.

Preferred telechelic polymers are those containing acyllactam initiator groups wherein A is $B(CO)_2$, B is a $C_4$ to $C_{10}$ hydrocarbyl radical, R is a $C_3$ or $C_5$ alkylene radical and $R_1$ is hydrogen. Especially preferred for fast polymerization initiation are the telechelic acyllactams in which B is a meta- or para-phenylene radical. Suitable initiator precursor groups are provided by groups such as acyl halides, isocyanates and ketenes.

The telechelic polymers may be formed by any conventional technique known to those skilled in the art. Examples of those formed from polyfunctional amines, such as those available from Texaco Chemical Company under the tradename JEFFAMINE ® may be found in U.S. Pat. No. 4,490,520; of those formed from polyols, in U.S. Pat. Re. No. 30,371; and of those formed from other functionalized polymers, in French Publication No. 2322165, published Mar. 25, 1977, and British Pat. No. 1,067,153.

One method for making telechelic polymers preferred for use in the invention comprises the following steps: (1) forming an acid halide by reacting a polyol with a stoichiometric excess of acid halide of the formula X-A-X, wherein A is $B(CO)_2$ and B is a $C_4$ to $C_{10}$ hydrocarbyl radical, preferably para- or meta-phenylene; and (2) reacting the resulting acid halide with lactam monomer to yield the acyllactam telechelic polymer. In step (1) essentially all the hydroxyl groups in the polyol are reacted with the acid halide to either link the polyol molecules or to provide acyl halide terminal groups of the formula -O-A-X. Step (1) is preferably carried out in the presence of a non-interfering solvent, e.g. cyclohexane, toluene, tetrahydrofuran, or acetone to facilitate removal of the hydrogen halide which is generated. It is also possible for the reaction to proceed without the presence of a solvent with the hydrogen halide being driven off with heat, vacuum, nitrogen sweeping or the like. When a solvent is employed in the reaction, a basic material which acts as an acid scavenger to produce a by-product which is insoluble in the solvent may be employed as a convenient means for removing the hydrogen halide. Well known acid scavengers such as tertiary amines may be employed. The above reaction can be carried out under essentially ambient conditions and will proceed even more rapidly at higher temperatures, e.g. 30° to 150° C. Precise temperature for the reaction may depend upon the solvent employed. If a solvent is employed it can be removed after the reaction by distillation.

Step (2), the reaction of the acid halide/polyol product with lactam monomer to prepare the telechelic polymer of the invention, can be conveniently carried out in the presence of a solvent, e.g., cyclohexane, toluene, acetone or excess lactam monomer, and an acid scavenger to facilitate the removal of hydrogen halide generated in the reaction. The reaction may also be carried out in the absence of a solvent. The previous discussion regarding the use of solvent and reaction conditions in connection with the step (1) reaction of the polyol with the acid halide applies here equally.

The product of step (1) can be isolated prior to reacting it with the lactam monomer, or it can be formed in situ and reacted with the lactam monomer without isolation.

When the graft polymer of the shell of the core-shell polymer contains a copolymerized reactive monomer such as a hydroxy or glycidyl functionalized monomer, it can be advantageous, before addition of the telechelic polymer, to react the anhydrous caprolactam dispersion with a polyisocyanate, a polyacyllactam, a polyimide or a polyureide to provide initiator units on the graft polymer capable of initiating caprolactam polymerization and hence capable of allowing graft polymerization of caprolactam onto the graft polymer to provide enhanced compatibility with the nylon-6 block copolymer formed at the subsequent polymerization step. The polyisocyanates are represented by the formula $B(NCO)_x$, the polyacyllactams and polyimides are represented by the formula

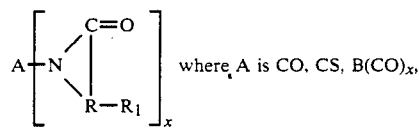 where A is CO, CS, $B(CO)_x$, and the polyureides are represented by the formula

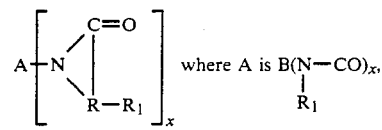 where A is $B(N-CO)_x$, $R_1$ and where B is a $C_1$ to $C_{30}$ hydrocarbyl radical, x is in the range of 2 to 4, R is a $C_4$ to $C_{11}$ alkylene or oxoalkylene radical and $R_1$ is a hydrogen or $C_1$ to $C_4$ alkyl radical. The reaction is advantageously carried out prior to the mixing of the lactam polymerization ingredients and is advantageously catalyzed with a catalyst which is inactive as a caprolactam polymerization catalyst or under conditions where such a catalyst is active as an imide-alcohol condensation catalyst and not as a caprolactam polymerization catalyst. Such catalysts include zinc caprolactam, calcium caprolactam, barium caprolactam, aluminum caprolactam, and magnesium caprolactam. Moreover, by the same reaction, some telechelic polymer containing acyllactam initiator groups can be reacted with the copolymerized reactive monomer in the shell of the core-shell polymer either prior to nylon-6 block copolymerization or it may react in situ during nylon-6 block copolymerization to provide telechelic polymer units grafted to the core-shell polymer to enhance compatibility of the shell with the nylon-6 block copolymer.

Another method of providing lactam ring functional monomer on the hard thermoplastic polymer shell of the core-shell polymer is to incorporate into the shell polymer a functional monomer such as an adduct of caprolactam and an isocyanato alkyl (meth)acrylate.

An alternative route to dispersions and rubber-modified reaction molded nylon-6 block copolymer compositions of the invention is obtained by adding a polyol and a low molecular weight lactam polymerization initiator selected from the polyisocyanates, polyacyllactams, polyimides and polyureides set forth hereinabove, to the dispersion of core-shell polymer in caprolactam. In the presence of a suitable catalyst the polyol and the low molecular weight lactam polymerization initiator which must be in stoichiometric excess over the polyol, react to form the telechelic polymer either prior to or simultaneously with lactam polymerization. The polyol thus provides the soft segments of the nylon block copolymer. Reaction of the polyol and initiator prior to lactam polymerization is preferred and can be obtained by using catalysts such as zinc caprolactam, calcium caprolactam, barium caprolactam, aluminum caprolactam, and magnesium caprolactam, or with the more active catalysts discussed hereinbelow for caprolactam polymerization by carrying out the reaction at a temperature below 130° C., preferably 80°-110° C. The polyol is advantageously of number average molecular weight in the range of about 500 to about 10,000 and comprises a backbone to which the hydroxyl groups are attached and which contains segments as previously described for the backbone segments of the telechelic polymer. Some grafting of the polyol to the core-shell polymer may occur by reaction of the polyol with grafted initiator groups block copolymer.

In order to polymerize the caprolactam solution of telechelic polymer containing the dispersion of core-shell polymer, a final reaction mixture containing effective concentrations of catalyst and initiator groups provided by the telechelic polymer is prepared and allowed to react. Suitable caprolactam polymerization catalysts include lactam magnesium halides and alkali metal lactamates prepared in caprolactam solution by methods well known in the art. For fast polymerization catalysis with acyllactam initiators lactam magnesium halide catalysts can be selected. Preferred lactam magnesium halides include caprolactam and 2-pyrrolidinone magnesium bromides. In a preferred embodiment, enhancement of the rate of polymerization for reactive fabrication processes can be achieved with additional initiator added in the form of low molecular weight compounds, such as (iso-)terephthaloyl bis-caprolactam, to provide up to about 70 percent of the total number of initiator groups present in the reaction mixture. It may be convenient to add the caprolactam solution of catalyst to the dispersion of core-shell polymer in caprolactam rather than adding the telechelic polymer or it may be convenient to form two reaction compositions, the first containing core-shell polymer dispersed in caprolactam solution of telechelic polymer and the second containing core-shell polymer dispersed in caprolactam solution of the caprolactam polymerization catalyst. Advantageously the concentrations are sufficient to provide substantially complete polymerization of the caprolactam to nylon-6 block copolymer in less than about 15 minutes at a reaction temperature in the range of about 130° to about 180° C. Satisfactory rates are generally obtained with about 2 to about 20 meq of initiator, in excess of any reactive groups of the graft polymer shell, per mole of caprolactam and with about 0.1 to about 20 mole percent catalyst per mole of caprolactam. Mixing can be done by hand or by pumpcasting. In pumpcasting, a dispersion containing core-shell polymer and telechelic polymer, is added to one of two reservoirs and a solution of polymerization catalyst in caprolactam is added to the other. The contents of the two reservoirs are pumped together, mixed intimately through a series of static mixers and the mixture is fed into a mold. The ratio of the dispersion to catalyst solution is adjusted by setting the two pumps at appropriate speeds. The casting is held in the mold for up to about 15 minutes. The peak temperature of the exotherm is normally achieved in less than 7 minutes.

The dispersions of the present invention may be modified by one or more conventional additives such as stabilizers and inhibitors of oxidative, thermal and ultraviolet light degradation. The oxidative and thermal stabilizers useful in the materials of the present invention include those used in polyamides, elastomers and addition polymers generally. They include, for example, Group I metal halides, e.g., sodium, potassium, and lithium, with cuprous halides, e.g., chloride, bromide, iodide, and also hindered phenols, hydroquinones, phosphites and varieties of substituted members of those groups and combinations thereof. Ultraviolet light stabilizers, can include various substituted resorcinols, salicylates, benzotriazoles, benzophenones, and the like. Lubricants and mold release agents, colorants, nucleating agents, plasticizers, glass fiber or fibrous and particulate inorganic fillers can also be added to modify the properties of the rubber modified nylon-6 block copolymer obtained from the dispersions.

The following examples illustrate the invention. Parts and percentages are by weight unless otherwise indicated. The physical properties given for the examples were obtained using tests substantially in accordance with the following procedures:

Flexural Modulus: ASTM D638 (units are megapascals, MPa)

Notched Izod Impact Strength: ASTM D256 (units are Joules per meter, J/m)

Standard Exotherm: A 30 gauge iron constantan thermocouple connected to a recording potentiometer, is positioned within a mold. The mold is heated to 160° Celcius (C.). A final reaction mixture is heated to about 100° C. and is introduced into the mold by pumpcasting and the temperature response is recorded. The thermal trace starts an immediate rise due to heat contributed by the mold and the initial exotherm of the lactam polymerization. Before the temperature levels, a second sharp rise may occur, which is believed to be due to heat of crystallization and heat from the final state of polymerization. The polymerization is considered to be complete when the temperature reaches a maximum and starts to fall. The mass is quite solid and the molded article may now be removed from the mold. The reaction time is the time interval between the addition of the reaction mixture to the mold and the attainment of maximum temperature. The overall reaction rate is considered to be proportional to the time for the temperature rise.

Particle Size: Measurement of latex particle size is done with a Coulter ® Nanosizer. The instrument measures the weight average size of particles in suspensions or emulsions between 40 and 3000 nm (i.e. 0.04 and 3 μ) diameter. The measuring principles used are those of Brownian motion and autocorrelation spectroscopy of scattered laser light. In order to determine the particle size, the latex is filtered through 4 layers of cheesecloth and using an eyedropper, a drop of filtered latex is added to 400 ml of distilled water containing one ml of 10% Triton ® X-100 solution in a clean, 500 ml volumetric flask and mixed well. The sample tube is first rinsed several times with the above solution and then half-filled and placed in the cellholder. The gain setting on the instrument is adjusted to 50±5 and the normalization constant set to corresponding ambient temperature. The appropriate particle size range is then determined by setting the range knob to automatic and time to 2 minutes. Finally, the range knob is set to the appropriate level and the particle size is recorded in 2 minutes.

EXAMPLE 1

Preparation of Butadiene Copolymer Latexes

A butadiene-acrylonitrile Copolymer latex is produced by polymerizing a mixture of 93 parts by weight of butadiene and 7 parts by weight of acrylonitrile at 75° C. to 98 percent conversion with a persulfate initiator. The latex has a solids content of 45% and a weight average particle size of 0.20 microns.

EXAMPLE 2

Preparation of Multiphase Core-Shell Polymer

The latex example containing 100 parts by weight of butadiene-acrylonitrile copolymer of 0.2 micron weight average particle size is charged to a reaction kettle fitted with a temperature controller, two Calibrated holding tanks (for monomer and persulfate solution additions), a baffle, a Teflon bladed agitator, and a condenser. The batch is purged by bubbling nitrogen into it through a sparger for about 15-20 minutes while the batch is gently stirred and brought to 80° C.

A monomer mixture containing 17.5 parts by weight styrene, 7.5 parts by weight acrylonitrile, and 0.125 parts of t-dodecyl mercaptan, and an aqueous solution of potassium persulfate containing 0.375 parts of persulfate in 30 parts by weight of water, are prepared.

The monomer mixture and the persulfate solution are charged to the holding tanks and are also purged by bubbling nitrogen for about 5-10 minutes. A nitrogen atmosphere is maintained in the kettle and tanks throughout the course of polymerization.

When the kettle contents reach 80° C., about 10-15% of the monomer and initiator charges are added to the batch. The batch is stirred for about 15 minutes. At the end of this time, the continuous addition of the streams of monomer and catalyst is started. The rate of addition of the two streams is adjusted to complete the addition in about 4 hours. Polymerization at 80° C. is then continued for an additional hour. Monomer conversion is 95 percent. At the end of polymerization, the batch is filtered through cheesecloth. In general very little coagulum is obtained despite the fact has no added emulsifier is charged during the course of polymerization.

When Method B of Example 4, below, is followed, to the filtered latex is added an aqueous emulsion containing 25% by weight of mixed alkylated aryl phosphites sold by Uniroyal Corp. under the tradename Polygard ® and 12.5% by weight of 2,6-di-t-butyl-4-methylphenol sold by Shell Chemical Corp. under the registered trademark Ionol.®. The amount added is designed to give 2 parts Polygard and 1 part Ionol per 100 parts of copolymer. The resulting stabilized latex is divided into two portions. One portion is coagulated by adding it to a 3% aqueous solution of magnesium sulfate hexahydrate at 95°-98° C. A ratio of 2-3 volumes of magnesium sulfate solution for 1 volume of latex is used. The coagulated material is filtered and washed several times on a filter with cold, filtered water. Most of the water is removed by vacuum filtration or by centrifugation to provide a butadiene-styrene copolymer cake.

EXAMPLE 3

Preparation of a Telechelic Polymer

A solution of 24.32 g (0.24 mole) of triethylamine in 30 ml. of tetrahydrofuran is added over a 10 minute period to a solution of 388.1 g (0.08 mole) of a polyoxypropylene triol terminated with ethylene oxide and having an average molecular weight of 5,000, sold by Union Carbide under the tradename NIAX ® 11-34, and 40.6 g 0.2 mole) of terephthaloyl chloride in 200 ml. of tetrahydrofuran in a 1-liter, four-necked, round-bottom flask equipped with stirrer, condenser, thermometer, and a pressure-equalizing dropping funnel. The temperature increases from 20° to 45 C., and a white precipitate is formed. The mixture is stirred for 4 hours.

A solution of 18.08 g 0.16 mole) caprolactam and 17.2 g (0.17 mole) of triethylamine in 30 ml. of tetrahydrofuran is added over 7 minutes. The temperature increases from 25° to 37° C. The mixture is heated to reflux at 75° C., and is held at reflux for 1.3 hours. As the mixture cools, 150 ml. of tetrahydrofuran is added.

The mixture is filtered through filter paper, and, the filter cake is washed with 40 ml. of tetrahydrofuran. Removal of the solvent from the combined filtrate and wash solvent under vacuum at 80° C. over 3 hours yields 361.5 g of a yellow, nearly translucent syrup. The average molecular weight of the telechelic polymer is 11,000; the average functionality or equivalence is 4.

EXAMPLE 4

Preparation of Core-Shell Polymer Dispersion in Caprolactam Solution of Telechelic Polymer

Method A

Caprolactam (containing 0.5 wt. 2,2,4-trimethyl-1,2-dihydroquinoline, available from Monsanto Company under the registered tradename Flectol ®H antioxidant) as an 80 wt. % solution in water is charged to a four necked round bottom flask fitted with a mechanical stirrer, thermometer with a temperature controller, a nitrogen inlet and a distillation head. The filtered latex of Example 2, prior to stabilization, is then slowly added at room temperature with good agitation. The contents in the flask are gradually heated to about 90°-100° C. with a good nitrogen sweep to strip off water. When all the water is stripped off, 1 wt. % isophthaloyl biscaprolactam, based on the weight of the caprolactam solution, is added, and the temperature is raised to 130° C. Some caprolactam is distilled over to obtain a water-free dispersion suitable for subsequent anionic polymerization. At this stage, telechelic polymer, formed by the method of Example 3, which has been dried at 90° C. for 3 hours under vacuum is added to the molten caprolactam latex dispersion with stirring. The amounts of telechelic polymer and latex are selected to yield the desired elastomer level in the final nylon block copolymer.

Method B

The aqueous filter cake of core-shell polymer obtained in Example 2 is added to a reaction flask. An 80 wt. % aqueous solution of caprolactam containing 0.5 wt. % Flectol ®H antioxidant is added, and the mixture is stirred gently until the cake has dispersed uniformly in the caprolactam solution. The dispersion is then dried by the method of Method A. At this stage, telechelic polymer which has been dried at 90° C. for 3 hours under vacuum, formed by the method of Example 3, is added to the molten caprolactam latex dispersion with stirring. The amounts of telechelic polymer and latex are selected to yield the desired elastomer level in the final nylon block copolymer.

EXAMPLE 5

Preparation of Rubber-Modified Nylon-6 From a Telechelic Polymer 200 g of the molten caprolactam solution of telechelic polymer containing dispersed core-shell polymer obtained by Method A of Example 4 is mixed with 30 ml of 0.63M caprolactam magnesium bromide in caprolactam and the mixture is polymerized in a mold at 158° C. The desired ratio of dispersion to catalyst solution is obtained by delivering them by pump set at appropriate speeds to a series of static mixers to provide the thoroughly mixed reactants for discharge into the hot mold. The mixture is held in the mold at the mold temperature for about 15 minutes. The peak temperature of the standard exotherm, hereinbefore defined, is normally achieved in less than 7 minutes.

EXAMPLE 6

Core-Shell Polymer

By the methods of Examples 1 and 2 the following core-shell polymer was prepared.

TABLE 1

| Example | Core diam. μ | Core:shell (wt. ratio) | Core* Composition | Shell* Composition |
|---|---|---|---|---|
| 6 | 0.17 | 100:25 | 93 BD/7 AN | 70 S/30 AN |

*BD: Butadiene; AN: Acrylonitrile; S: Styrene

EXAMPLES 7-10

Caprolactam Solution Dispersions

By Method A of Example 4, the caprolactam dispersions of Examples 7 and 8 set forth in Table 2 are prepared; the Control Examples, 9 and 10, are prepared substantially in accordance with Method A of Example 4, except that (1) no latex is added, and (2) the amount of telechelic polymer is adjusted to yield block copolymers with 30 and 20 wt. % elastomer, which is approximately the same total wt. % elastomer as in Examples 7 and 8, respectively. The dispersions are storage stable for a period of at least 2 weeks.

TABLE 2

| Example solution | Core-shell polymer Example | Caprolactam Solution Dispersion core-shell polymer* | caprolactam* | telechelic polymer* | BAIT* |
|---|---|---|---|---|---|
| 7 | 6 | 15.7 | 57.9 | 12.7 | 0.7 |
| 8 | 6 | 10.5 | 67.1 | 8.5 | 0.9 |
| 9 (control) | — | — | 58.5 | 30.0 | — |
| 10 (control) | — | — | 68.5 | 20.0 | — |

*parts per 100 parts final reaction mixture comprising dispersion and catalyst solution; BAIT: isophthaloyl biscaprolactam

EXAMPLES 11-14

Rubber-Modified Nylon-6 Block Copolymers

Rubber-modified nylon-6 block copolymers are prepared by the method of Example 5 and are subjected to mechanical testing. The data are set forth in Table 3.

TABLE 3

| Ex. | Caprolactam Dispersion | Block Copolymer Elastomer*: Nylon-6 (wt. ratio) | Flex Modulus (MPa) | Impact Strength (J/m notch) | Exotherm (°C./secs.) |
|---|---|---|---|---|---|
| 11 | 7 | 30:70 | 1393 | 696 | 173/112 |
| 12 | 8 | 20:80 | 2020 | 375 | 176/111 |
| 13 | 9 (control) | 30:70 | 828 | 803 | 153/120 |
| 14 | 10 (control) | 20:80 | 1690 | 428 | 156/169 |

*In Examples 11 and 12, approximately 50 wt. % of the elastomer is provided by the crosslinked elastomer core and the remainder, by the telechelic polymer; in Control Examples 13 and 14, all of the elastomer is provided by the telechelic polymer.

EXAMPLES 15 AND 16

Rubber-Modified Nylon-6 Block Copolymers

Example 15 is prepared from a dispersion similar to the dispersion of Example 8 except that no isophthaloyl biscaprolactam initiator is added. A tough nylon-6 block copolymer is obtained, possessing good impact and flexural strength. Elastomer content: 20%; Exotherm (° C./secs): 173/507.

Example 16 is a rubber-modified nylon-6 block copolymer preparation from a dispersion according to the invention comprising a copolymer containing a core-shell polymer with reactive groups in the shell. The shell composition of the core-shell polymer contains 60 wt. % styrene, 30 wt. % acrylonitrile, and wt. % 2-hydroxy propyl methacrylate. The block copolymer prepared by the methods used for Example 12 is tough and has impact resistance.

EXAMPLE 17

Preparation of Core-Shell Polymer Dispersion in Caprolactam Solution of Polyol and Initiator A core-shell polymer dispersion in caprolactam solution of polyol and initiator is obtained by the procedures described in Method A of Example 4 except that the telechelic polymer is omitted and prior to raising the temperature to 130° C., NIAX ® 11-34 polyol and terephthaloyl bis-caprolactam are added to provide a lactam-terminated telechelic polymer upon reaction with the polyol.

EXAMPLE 18

Preparation of Rubber-Modified Nylon-6 From a Polyol and an Initiator

The procedure of Example 5 is followed, except that the dispersion of Example 17 is substituted for the dispersion of Example 4.

EXAMPLES 19 AND 20

Caprolactam Solution Dispersions

By Example 17, the caprolactam dispersions of Examples 19 and 20 set forth in Table 4 are prepared. Rubber-modified nylon-6 block copolymers are prepared from these dispersions by the method of Example 18.

TABLE 4

| Ex. | Core-shell polymer Example | Caprolactam Solution Dispersion | | | |
|---|---|---|---|---|---|
| | | core-shell polymer* | caprolactam* | polyol* (NIAX ® 11-34) | BATT* |
| 19 | 6 | 15.7 | 57.4 | 11.4 | 2.5 |
| 20 | 6 | 10.5 | 67.1 | 7.7 | 1.7 |

*parts per 100 parts of final reaction mixture comprising dispersion and catalyst solution; BATT: terephthaloyl biscaprolactam initiator

I claim:

1. A substantially colloidal dispersion of a core-shell polymer in a solution of telechelic polymer in caprolactam; wherein the core-shell polymer comprises a crosslinked elastomer core and a hard thermoplastic polymer shell; wherein the weight ratio of elastomer core to caprolactam and the weight ratio of telechelic polymer to caprolactam are independently in the range of about 1:99 to about 40:60; and wherein the telechelic polymer is of number average molecular weight in the range of about 700 to about 10000, is capped on average with at least two lactam polymerization initiator groups or precursors thereof per molecule, and is capable of providing soft segments in a nylon-6 block copolymer.

2. The dispersion of claim 1 wherein the elastomer core of the core-shell polymer comprises an elastomer selected from the group consisting of diene elastomers, acrylic elastomers and polyurethane elastomers, the hard thermoplastic polymer shell comprises a polymer of glass transition temperature greater than about 35° C. and the weight ratio of core to shell is in the range of about 9:1 to about 1:1.

3. The dispersion of claim 2 wherein the hard thermoplastic polymer shell is a copolymer of styrene and at least one comonomer selected from the group consisting of acrylonitrile, methacrylonitrile, and methyl methacrylate in the weight ratio of about 9:1 to about 6:4.

4. The dispersion of claim 3 wherein the elastomer core has a weight average particle diameter in the range of about 0.1 to about 0.8 micron and the hard shell has a thickness of at least about 0.015 micron.

5. The dispersion of claim 4 wherein the hard thermoplastic shell is a copolymer containing from about 1 to about 10 weight percent of a monomer selected from the group consisting of hydroxy (meth)acrylates, (meth)allyl alcohols, glycidyl (meth)acrylates and isocyanato alkyl (meth)acrylatecaprolactam adducts.

6. The dispersion of claim 1 wherein the telechelic polymer comprises from about 2 to 6 lactam polymerization initiator groups or precursors thereof per molecule and wherein the backbone of the telechelic polymer comprises segments selected from the group consisting of polyalkylene oxides, polyalkadienes and alkadiene (meth)acrylonitrile copolymers of number average molecular weight in the range of about 500 to about 5000 and wherein the initiator groups are represented by the formula

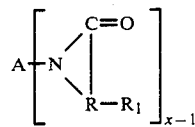

where A is CO, CS, $B(CO)_x$, $B(CS)_x$, or $B(NHCO)_x$,

where B is a $C_1$ to $C_{30}$ hydrocarbyl radical, where x is in the range of 2 to 4, where R is a $C_4$ to $C_{11}$ alkylene or oxoalkylene radical, $R_1$ is hydrogen or a $C_1$ to $C_4$ alkyl radical and $R_2$ is a $C_1$ to $C_{10}$ hydrocarbyl radical.

7. The dispersion of claim 6 wherein A is $B(CO)_2$, B is a $C_4$ to $C_{10}$ hydrocarbyl radical, R is a $C_3$ or $C_5$ alkylene radical and $R_1$ is hydrogen.

8. The dispersion of claim 7, wherein B is meta- or para-phenylene.

9. The dispersion of claim 1 further comprising an effective amount of a caprolactam polymerization catalyst to polymerize the caprolactam.

10. The dispersion of claim 1, wherein the telechelic polymer is formed in situ from a polyol and a stoichiometric excess of a low molecular weight lactam polymerization initiator; wherein the polyol is at least difunctional and is of a number average molecular weight in the range of about 500 to about 10,000; wherein the lactam polymerization initiator is at least difunctional; and wherein the weight ratio of crosslinked elastomer core to caprolactam and the weight ratio of polyol to caprolactam are independently in the range of about 1:99 to about 40:60.

11. An article comprising rubber-modified reaction molded nylon-6 block copolymer composition prepared by reaction molding a dispersion according to claim 1.

12. A process of reaction molding a rubber modified nylon-6 block copolymer wherein two reaction compositions are intimately mixed and the mixture is added to a mold and subjected to reaction molding conditions until polymerization is essentially complete, wherein the first reaction composition comprises a caprolactam solution of a telechelic polymer or of a polyol and a caprolactam polymerization initiator capable of forming the telechelic polymer in situ, wherein the second composition comprises a caprolactam solution of an effective amount of a catalyst for caprolactam polymerization, wherein the telechelic polymer provides an average of at least two lactam polymerization initiator groups or precursors thereof per molecule of telechelic polymer and provides an effective concentration of initiator groups for caprolactam polymerization, wherein at least one of the first and second reaction compositions comprises a substantially colloidal dispersion of core-shell polymer, wherein the core-shell polymer comprises a crosslinked elastomer core and a hard thermoplastic polymer shell, and wherein the weight ratios of crosslinked elastomer core to total caprolactam and telechelic polymer to total caprolactam are independently in the range of about 1:99 to about 40:60.

13. The process of claim 12 wherein the crosslinked elastomer core of the core-shell polymer comprises an elastomer selected from the group consisting of diene elastomers, ethylene-propylene-diene rubbers, acrylic elastomers and polyurethane elastomers, the hard thermoplastic polymer shell comprises a polymer of glass transition temperature greater than about 35° C. and the weight ratio of core to shell is in the range of about 9:1 to about 1:1.

14. The process of claim 13 wherein the crosslinked elastomer core has a weight average particle diameter in the range of about 0.1 to about 0.8 micron and the hard shell has a thickness of at least about 0.015 micron.

15. The process of claim 14 wherein the telechelic polymer comprises from about 2 to about 6 lactam polymerization initiator groups or precursors thereof per molecule, and wherein the backbone of the telechelic polymer or polyol comprises segments selected from the group consisting of polyalkylene oxides, polyalkadienes and alkadiene (meth)acrylonitrile copolymers of number average molecular weight in the range of about 500 to about 5000 and wherein the lactam polymerization initiator groups are represented by the formula

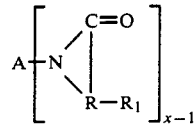

where A is CO, CS, B(CO)$_x$, B(CS)$_x$, or B(NHCO)$_x$,

where B is a C$_1$ to C$_{30}$ hydrocarbyl radical, where x is in the range of 2 to 4, where R is a C$_4$ to C$_{11}$ alkylene or oxoalkylene radical, R$_1$ is hydrogen or a C$_1$ to C$_4$ alkyl radical and R$_2$ is a C$_1$ to C$_{10}$ hydrocarbyl radical.

* * * * *